July 27, 1954  J. MYNAR, JR  2,685,018
AUTOMATIC NUT LOADING MACHINE
Filed June 29, 1951  2 Sheets-Sheet 2
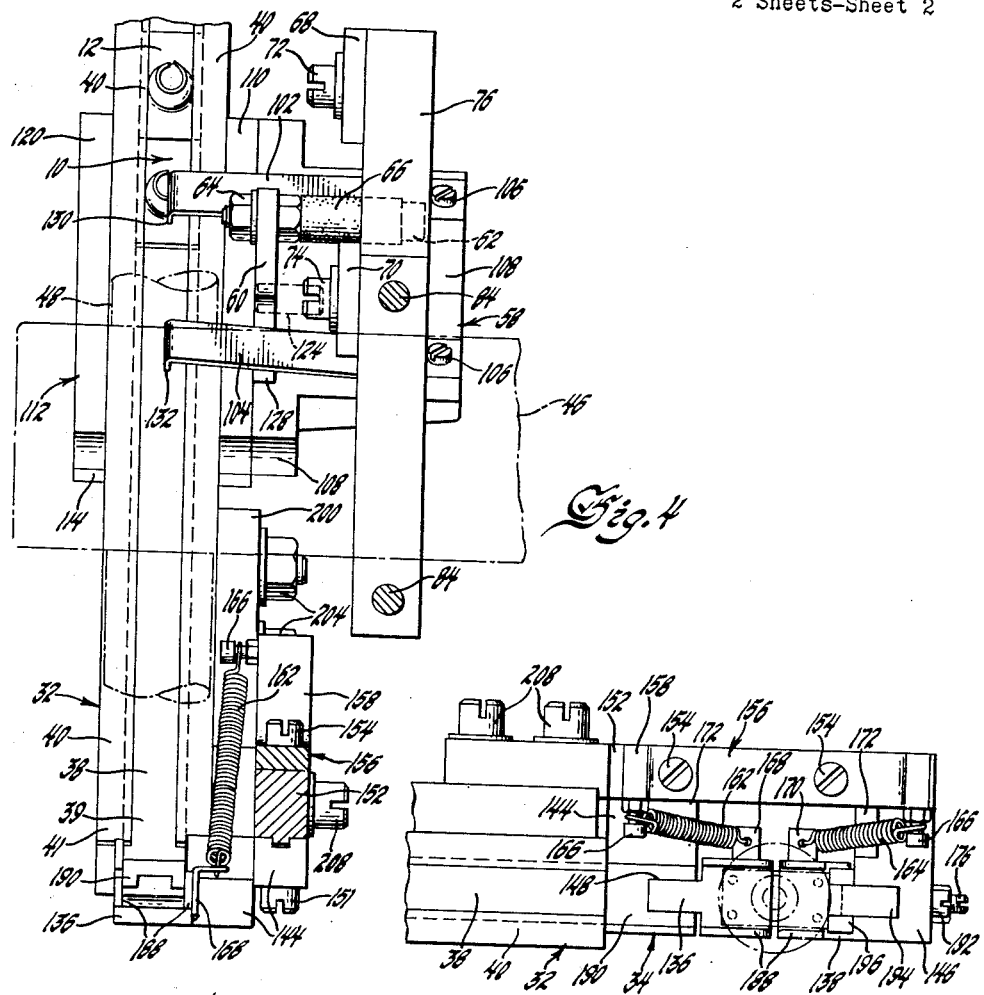
Fig. 4
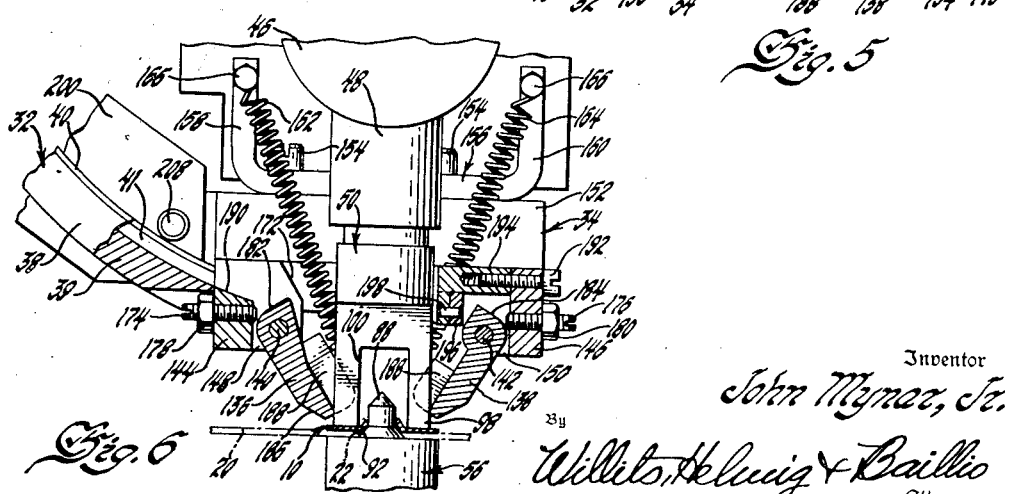
Fig. 5
Fig. 6
Inventor
John Mynar, Jr.
By Willits, Helwig & Baillio
Attorneys Patented July 27, 1954

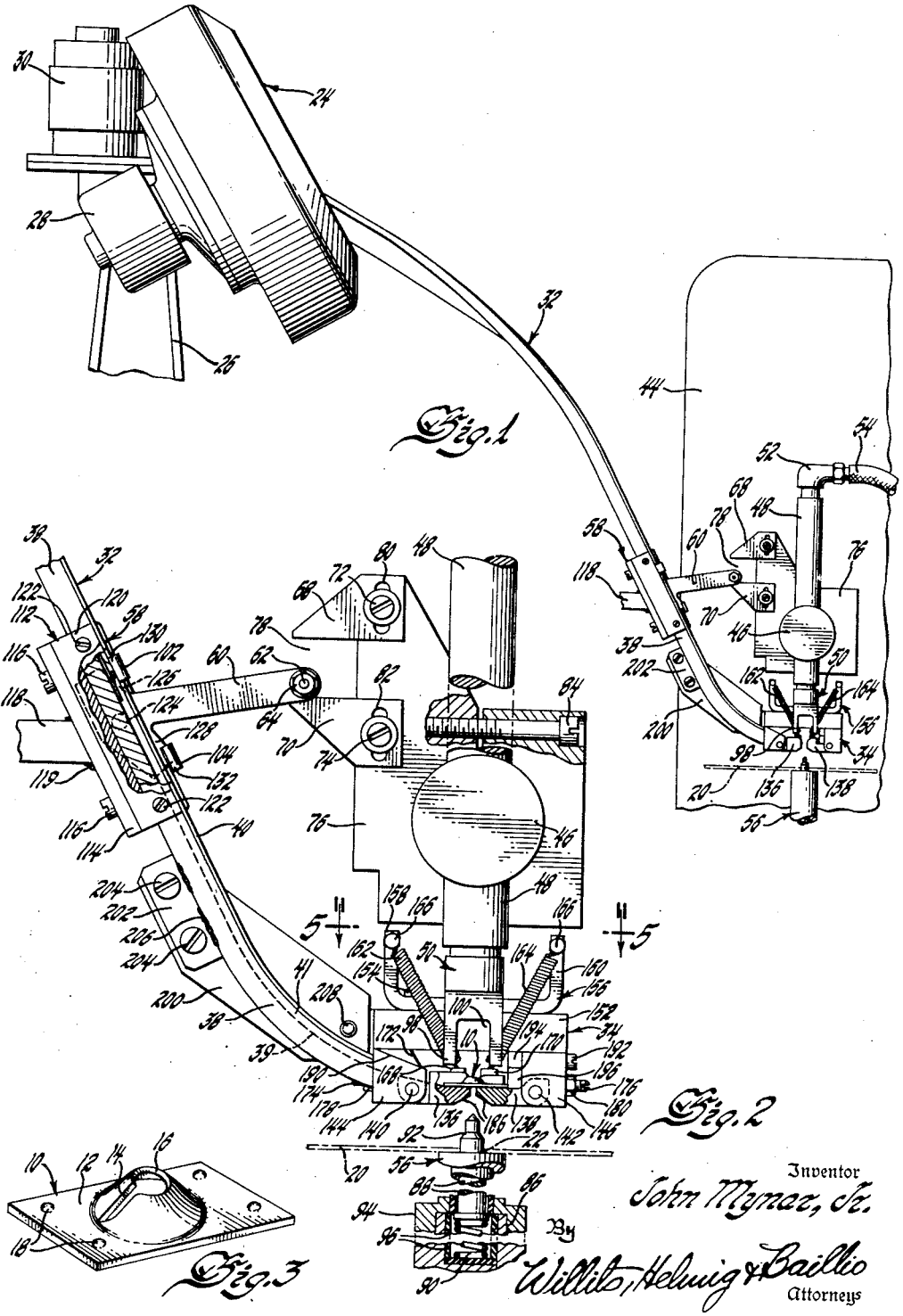

2,685,018

UNITED STATES PATENT OFFICE 2,685,018

AUTOMATIC NUT LOADING MACHINE

John Mynar, Jr., Flint, Mich., assignor to General Motors Corporation, Detroit, Mich., a corporation of Delaware Application June 29, 1951, Serial No. 234,258

5 Claims. (Cl. 219—4)

This invention relates to an apparatus for positioning articles to be attached to a supporting body and particularly to a machine for locating nuts to be attached to sheet material. My invention is more specifically and advantageously embodied in an automatic nut-feeding and projection welding machine.

Certain types of fasteners, such as the sheet metal nuts which are commonly referred to as "pressed hole" nuts, are frequently attached to sheet metal members by projection welding. Heretofore such nuts usually have been placed in position manually preparatory to the actual welding operation. Inasmuch as the sizes of the parts requiring welded pressed hole nuts differ substantially, ranging from those having surface areas of a few square inches to those having areas of several square feet, the problems involved in welding nuts to these parts vary considerably. For example, some of the smaller parts may be handled by one operator who both maneuvers the metal sheet and places the nuts in position between these electrodes, while many of the larger sheets require two or more persons to perform these functions. In view of the fact that labor costs constitute a major portion of the expense in locating and welding such nuts to sheet metal parts, it is apparent that an automatic machine to perform the feeding and positioning operations is highly desirable from an economic standpoint.

Accordingly, a principal object of my invention is to provide an automatic machine which both feeds and locates nuts between the electrodes of a projection or resistance welder, or which performs a similar function with other fasteners in analogous attaching machines, thereby eliminating the manual handling of the nuts or other fasteners. A further object of this invention is to provide such a machine which is simple to operate, inexpensive to maintain, and which eliminates all manual operations except the placement and removal of the sheet material to which the nuts or other fasteners are to be attached.

These and other objects are attained in accordance with my invention by providing a loading machine having a hopper which automatically feeds nuts onto a track in proper position for subsequent locating between the electrodes of a projection welder. This track is provided with an escapement mechanism whose operation is coordinated with the reciprocable movement of an electrode and which feeds the nuts one at a time to a nut-positioning assembly in the projecting welding portion of the machine. A pair of spring-loaded rocker arms are pivotally mounted on a support adjacent the electrode tips and the lower or outlet end of the track and function as extensions thereof when the electrodes are not in welding position. That is, these rocker arms are mounted so that the normal locations of their receiving portions are between the electrodes of the welder when the electrodes thereof are in an open or disengaged position. When in this location between the electrodes, the rocker arms receive the nuts, which are released one at a time by the nut-feeding or escape mechanism.

Reciprocal movement of one of the electrodes pivots the rocker arms out from between the electrodes and forces the nut which had been held by the rocker arms around the tip of a locating pin in the other electrode and into engagement with the metal sheet to which it is to be attached. After the welding operation is completed, the movable electrode is withdrawn so that its tip is out of contact with the surface of the attached nut, permitting the pivotally mounted rocker arms to return by spring pressure to their normal positions adjacent the outlet end of the track. Thus it may be seen that the various feeding, positioning, and welding steps all may be automatically performed in one series of operation, the welding of each nut completed within a matter of a fraction of a second. In this manner a single operator may rapidly weld a multiplicity of such nuts to metal sheets with a minimum of physical effort.

Other objects and advantages of this invention will more fully appear from the following description of the preferred embodiment of the invention shown in the accompanying drawings, in which:

Fig. 1 is a fragmentary front elevational view of a nut loading machine embodying the invention;

Fig. 2 is an enlarged fragmentary elevational view, with parts broken away and in section, generally showing the projection welder, the nut-feeding or escapement mechanism, and the nut-positioning assembly portions of the machine shown in Fig. 1;

Fig. 3 is an enlarged perspective view showing a form of nut for which the modification of the nut loading and welding machine shown is especially adapted;

Fig. 4 is an enlarged vertical end view, showing the escape mechanism on the nut-feeding track;

Fig. 5 is an enlarged horizontal sectional view, generally along the line 5—5 of Fig. 2, showing the nut-positioning assembly; and Fig. 6 is an enlarged fragmentary elevational view, with parts broken away and in section, showing details of the projection welder electrodes and the nut-positioning assembly.

Referring more particularly to the drawings, Fig. 3 shows a form of sheet metal "pressed hole" nut, designated generally by the numeral 10, which may be used with my invention. This nut is shown as consisting of a body or base portion 12 of substantially rectangular form in cross section and which has its center provided with a formed thread 14 extending from the circumference of a pierced hole 16. The thread, which has a developed shape, protrudes from one face of the nut, while a plurality of spaced welding projections 18 are shown as extending from the opposite face. This nut is designed to be welded to another sheet metal part by means of a projection or resistance welder.

A metal sheet 20 to which the nut is to be welded is shown in Figs. 1, 2 and 6, this sheet being provided with an opening 22 which is sufficiently large to allow clearance for a sheet metal screw. Pressed hole nuts which are attached to a metal sheet in the manner hereinafter described therefore function as reinforcing members. When used in assembly the part to which the nut is welded is held securely to another part by means of a sheet metal screw having a washer between the latter sheet and the head of the screw. This type of assembly not only provides a rigid holding union but it is economical to use and easily assembled.

A form of my machine which automatically serves to feed, position and weld the pressed hole nuts 10 to the metal sheet 20 is shown generally in Fig. 1. This machine is shown as including a motorized barrel-type hopper, generally designated by 24, which is mounted on an adjustable support 26 and which contains the nuts to be welded. The hopper is provided with a gear box 28 which is secured by a swivel connection, not shown, to the adjustable hopper support 26. The gear box 28 in turn is operatively connected to an electric motor 30 which is also mounted on the adjustable support 26.

A track 32 for conveying the nuts 10 to a nut-positioning or locating assembly, indicated generally at 34, adjacent the upper electrode of the projection welder portion of the machine has its upper end secured to the hopper 24 and its lower end attached to the nut-positioning assembly. The track consists essentially of a gently curved, elongated channel 36 having a base 39 and upstanding longitudinally extending side flange portions 41 to whose upper edges are attached a pair of inwardly extending nut guiding strips 49 which retain the sliding nuts on the track. The construction and inclination of the track are preferably such as to insure sufficient velocity of the nuts being fed to the welder even if these nuts are slightly deformed or excessively oily.

The projection welder includes a frame or supporting portion 44 to which is connected a laterally extending movable upper welding arm 46 and a lower welding arm, not shown, which is stationary in the modification shown in the drawings. The upper welding arm is preferably cylindrical, as shown, and supports an upper electrode holder 48. This holder extends vertically through the upper welding arm 46 and is locked thereto by a clamp which permits the vertical and radial adjustment of the holder. An upper electrode 50 is rigidly secured by conventional means in the lower end of the holder 48. The welder, of course, is provided with means to vertically reciprocate the upper welding arm, holder and electrode. Attached to the upper end of this electrode holder by a connector 52 is a cable 54 which carries a fluid coolant to the upper electrode.

A stationary lower electrode 56 is similarly affixed in the end of a lower electrode holder, not shown, which is adjustably supported by the lower welding arm. The upper end face of the lower electrode, which is also suitably cooled, provides a supporting surface for the metal sheet 20 to which the nut 10 is to be affixed.

An escape mechanism, indicated generally at 58, for feeding the nuts one at a time to the welder is located on the track in the vicinity of the welder. This escape mechanism includes a pivotally mounted, generally T-shaped lever 60 whose longest arm is provided at its end nearest the welder with a laterally extending pin or stud 62, which is shown as being secured to the lever 60 by a nut 64. Encasing this pin is an insulating sleeve 66 for preventing any possible short circuiting of the welding current.

As best shown in Fig. 2, upper and lower pin-engaging cams 68 and 70, respectively, are secured by cap screws 72 and 74 to a cam-supporting plate 76 and function with the latter as an actuating arm for the escape mechanism. The lower edge of the upper cam 68 and the upper edge of the lower cam 70 define with the adjacent edge of the plate 76 a recess 78 into which the insulated pin 62 extends. The cam-supporting plate in turn is rigidly secured to the upper welding arm 46 of the welder and is vertically movable therewith. Accordingly, reciprocation of the upper electrode and the attached plate 76 causes the adjacent inner edges of the cams 68 and 70 to engage the pin 62 to pivotally operate the lever 60 of the nut-release or escape mechanism 58.

In the form of my invention shown in the drawings, the cams 68 and 70 are provided with vertically extending slots 80 and 82 through which the cap screws 72 and 74 extend and which permit vertical adjustment of the cams on the plate 76. This adjustablility of the cams provides a means of compensating for variations in the length of stroke of the movable upper electrode, thereby insuring proper timing in the operation of the escape mechanism. The length of stroke of the upper electrode in turn is governed by the particular application of the machine and the sizes of the parts to be welded together. The cam-supporting plate 76 is shown as formed in two sections which are clamped around the cylindrical upper welding arm 46 by screws 84. Such a construction provides additional flexibility by permitting adjustment of the plate 76 circumferentially and longitudinally on the upper welding arm.

The details of the nut-feeding or escapement mechanism 58, the nut-positioning assembly 34 and the electrode structures are shown in Figs. 4 through 6. The upper portion of the lower electrode 56 is provided with a longitudinally extending recess or bore 86 in which a locating pin 88 for the nuts is resiliently mounted. A compression spring 90, which is shown as being of the helical type, is positioned between the bottom of the locating pin and the base of recess 86 and serves to bias the pin in its uppermost position before and after the actual welding operation. This construction permits the locating pin to be moved vertically downward into the recess 86 in the lower electrode when the downward movement of the upper electrode contacts the nut and causes it to engage a shoulder 92 on the locating pin, thereby forcing the body portion 16 of the nut into contact with the upper surface of the metal sheet 20. The spring 90 and the locating pin 88 are separated from the outer casing portion 94 of the lower electrode by a sleeve 96 of insulating material. The upper electrode 50 has a bifurcated end portion 98 which provides a recess or notch 100 into which the protruding thread portion 14 of the nut to be welded and the locating pin extend when the electrodes are in their engaged welding positions.

As can best be seen in Fig. 4, the nut-feeding or escape mechanism 58 on the track leading from the hopper to the electrodes includes a pair of laterally extending resilient spring fingers 102 and 104, each of which is secured at one end by a screw 106 to a connecting bracket 108. This bracket is attached by laterally extending screws, not shown, to the abutting leg 110 of a track-supporting member 112 having a generally U-shaped cross section. Similarly, a plate 114 is affixed by screws 116 to the base of the member 112 and is shown as welded to a supporting arm 118. This arm in turn is welded, as indicated at 119, or otherwise suitably connected to the welder frame portion 44 or the adjustable hopper support 26, the supporting arm also preferably being adjustable in all vertical and horizontal directions. The opposite leg 120 of the U-shaped member 112 is secured by screws 122 to the adjacent side of the track channel 38. This construction lends structural rigidity to the track and permits the welder or hopper frames to support the nut-positioning assembly 34 as well as the track and escape mechanism 58.

The operating lever 60 for the escape mechanism is pivotally supported on a pin 124, which extends laterally through the connecting bracket 108 with one end abutting the leg 110 of the U-shaped track-supporting member 112. Arms 126 and 128 of lever 60 extend generally parallel to the track and engage the under surfaces of the spring fingers 102 and 104. Hence pivotal movement of the lever 60 on pin 124 alternately flexes the spring fingers 102 and 104 away from the track, the resilience of these spring fingers causing each to return toward the track when the other is flexed away from the track. Flanges 130 and 132 on the free ends of the spring fingers 102 and 104, respectively, are adapted to project against the nut-engaging upper face of the track channel 38 or the upper surfaces of the nuts 10 to alternately retain the nuts against the track and release them one at a time to the nut-positioning assembly 34.

The nut-positioning or locating assembly 34 is used to position the nuts between the electrodes preparatory to the actual welding operation. This locating mechanism includes rocker arms 136 and 138 which are pivotally mounted on pins 140 and 142, respectively. These pins are journaled in metal supporting blocks 144 and 146 which are provided with recesses 148 and 150 in which the rocker arms pivot. The blocks 144 and 146 are affixed by screws 151 to the bottom surface of a transversing extending plate or crossbar 152.

Affixed to the upper surface of the crossbar 152 by screws 154 is a generally U-shaped yoke 156 having upwardly extending legs 158 and 160. Helical tension springs 162 and 164 are shown as attached to the upper ends of legs 158 and 160 by screws 156. As best shown in Fig. 5, the lower ends of these springs are secured to laterally extending tabs 168 and 170 on the rocker arms 136 and 138, respectively, the springs being thereby kept under tension to resiliently maintain the rocker arms in proper position. Each of the blocks 144 and 146 has an inner portion cutaway at an angle which approximately parallels the nearest spring, as indicated at 172, to provide clearance for the springs when the rocker arms are in their depressed positions.

Adjusting screws 174 and 176, provided with lock nuts 178 and 180, are located in the outer end portions of blocks 144 and 146, respectively, with the inner ends of the screws extending into the recesses 148 and 150 to function as stops for the rocker arms by contacting the adjacent end surfaces 182 and 184 of the latter. These screws may be threaded into the blocks to predetermined extents, thus permitting the rocker arms to be adjusted in their normal nut-receiving positions at angles suitable for the particular nuts to be welded.

It will be noted that the nut-engaging ends of the rocker arms have their bottom surfaces chamfered, as shown at 186, to provide clearance for the locating pin 88 in the lower electrode when this pin is in its uppermost position. Furthermore, each of the rocker arms has its side edges provided with upwardly extending flanges 188 which serve as continuations of the upstanding side wall or flange portions 41 of the track channel 38 when the rocker arms are in their nut-holding positions. These flanges 188 on the rocker arms serve to form a nest for the nut 10 to aid in maintaining it in proper position between the electrode tips prior to welding. Similarly, block 144 is shown as having an oblique groove 190 formed in its upper portion which also functions as a continuation of the track to convey the nuts to the rocker arms.

Positioned within the recess provided in block 146 and secured to the block by a screw 192 is an L-shaped bracket 194, the shorter leg of which is shown as being of reduced thickness and extending downwardly to a point immediately above rocker arm 138. A permanent magnet 196, which is preferably of the Alnico type and shown as being U-shaped, is affixed to the bracket 194 by a pin 198. The legs of this magnet extend around the shorter depending leg of the bracket 194 and toward the track so as to permit their end faces to contact a nut which is positioned on the rocker arms preparatory to the welding of the nut. Thus it may be seen that a nut, after sliding down the track, through the groove 190 in block 144 and onto the rocker arms 136 and 138, is magnetically drawn into proper position and maintained in perfect alignment on the rocker arms by the magnet 196.

This construction not only serves to hold the nut in position on the rocker arms but also prevents the nut from rebounding out of position on contact with the nut-positioning assembly after sliding down the track. As hereinbefore indicated, the nut-contacting surfaces and inclination of the track are, of course, preferably selected so as to provide the sliding nut with proper velocity. However, the incorporation of a magnet insures perfect positioning of the nut on the rocker arms by drawing and maintaining the nut against the end faces of the legs of the magnet if the velocity of the nut is inadequate to do this. In this manner the nut to be welded is always perfectly aligned with the tip of the locating pin 88 in the lower electrode.

The entire nut-positioning assembly is supported by the track 34 at its lower end by means of a bracket 200. A metal block 202 is attached to the upper end of the bracket 200 by nut and bolt assemblies 204 and is secured to the under surface of the track channel 38 by welding, as indicated at 206, or other suitable means. The lower end of the bracket 200 is shown as affixed by a pair of screws 208 to the crossbar 152. The openings in the crossbar for receiving the lower screws 208 are preferably in the form of laterally extending slots, while vertical slots may be provided in the block 202 to receive the upper screws 204. Such a construction insures further vertical and lateral adjustability of the nut-positioning assembly relative to the electrodes.

All the parts of my machine which are in the vicinity of the electrodes, including the track 32, the nut-feeding or escape mechanism 58, the nut-positioning assembly 34 except for the magnet 196, and all associated supporting parts, are preferably constructed of non-magnetic materials, such as brass and certain stainless steels. This is desirable because if these parts were of metals having a high magnetic permeability, the strong magnetic field produced around the electrodes during the welding operation would attract these metals to such an extent as to cause excessive resistance to movement between the working parts of the nut-positioning assembly and the escape mechanism. Moreover, as these magnetic materials tend to be drawn toward the electrodes, they would become heated as they absorbed magnetic energy, causing expansion of these parts and further hindering the easy operation of the moving parts. Magnetization of such parts would also cause them to attract dust and other undesirable foreign particles.

The sequence of operation of my automatic nut-loading and projection welding machine embodying the invention is as follows. The sheet metal sheet or panel 20 is first inserted between the tips of the electrodes and placed on the upper end surface of the lower electrode so that the locating pin 58 extends through the opening 22 in the metal sheet. Starting the motor 30 for the hopper 24 causes the hopper to automatically feed a series of nuts 10 onto the track 32, the track normally being completely occupied by these nuts from the hopper to the escape mechanism 58. While the hopper is feeding the nuts to the track, the operator regulates the vertical reciprocation of the upper electrode 50 to perform the welding operation.

Inasmuch as the cam-supporting plate 76 is rigidly fixed to the upper welding arm, as hereinbefore described, this plate, together with cams 68 and 70, will reciprocate with the upper electrode. Accordingly, the insulated pin or stud 62 at the end of the lever 60 is contacted by the upper edge of the lower cam 70 on the upward movement of the upper electrode 50 and by the lower edge of the upper cam 68 on the downward movement of this electrode. Such contact between the stud 62 and the cams pivots the lever 60 on the pin 124, alternately causing the arm portions 126 and 128 of the lever to engage the under surfaces of the spring fingers 102 and 104, respectively. In this manner the end flanges 130 and 132 on the spring fingers are alternately flexed out of engagement with the nut-supporting upper face of the track channel 38 or the nuts 10, the resilience of the spring fingers causing their return toward the track when they are alternately disengaged by arms 126 and 128.

Thus it can be seen that as the upper electrode is initially lowered the spring finger 102, which has been retaining the first nut to be welded, is flexed away from the track by the upper arm 126, and the spring finger 104 is permitted by the lower arm 128 to simultaneously return into engagement with the track. When the spring fingers are in these positions, the nut-engaging flange 130 on the upper spring finger 102 releases the nut, permitting it to slide down the track a short distance and to be retained by the flange 132 on the lower spring finger 104. A second nut meanwhile has slid down the track against the first nut and immediately beneath the flange 130 on spring finger 102. When the upper electrode is subsequently moved upwardly, the lever 60 is pivoted in the opposite direction and flexes the lower spring finger 104 away from the track. The resultant disengagement between the flange 132 and the first nut releases this nut and allows it to slide down the track to the nut-positioning assembly 34. Simultaneously, of course, the upper spring finger 102 is permitted by arm 126 to return toward the track so that its end flange 130 engages the upper surface of the second nut and retains it and the column of nuts above it stationary within the track when the first nut is released.

It will be noted that the escape mechanism is designed to provide a relatively large clearance between the arm 126 and the flange 130 on the upper spring finger 10 when these parts are not in engagement, thus permitting this flange to actually contact the second nut before the first nut is released by flange 132 on the lower spring finger 104. This dimensional relationship between the parts precludes the possibility of two nuts being simultaneously fed to the nut-positioning assembly 34. Further reciprocation of the upper electrode, of course, causes the above cycle to be repeated.

The upward movement of the upper electrode 50, which caused the release of the first nut, permits the spring-loaded pivotable rocker arms 136 and 138 of the nut-positioning assembly to assume their uppermost positions as extensions of the track 40. Accordingly, these rocker arms are in position to receive the released nut after it slides down the track 84 and through the groove 190 in supporting block 144. This nut is then drawn by magnet 196 into proper position on the rocker arms and retained by this magnet in the nest formed between the rocker arm flanges 188.

When the upper electrode is subsequently lowered, its bifurcated tip 98 contacts the upper surfaces of the base or body portion 12 of the nut and forces the nut downwardly against the rocker arms 136 and 138. As the upper electrode continues to descend, it pivots the rocker arms downwardly and outwardly against the resistance of the springs 162 and 164 forcing the nut between the rocker arms and into engagement with the retractable locating pin 88 in the upper end of the lower electrode. Thus the formed thread portion 14 of the nut is pressed into abutting engagement with the shoulder 92 on the locating pin, and this pin is thereby driven downwardly into its retracted position against the pressure of the helical spring 90. In this manner the spaced welding projections 18 on the bottom of the body portion of the nut are forced into contact with the upper surface of the sheet metal member 20 and serve to localize the carrying of the electrical current. The nut is then held under pressure between the two electrodes and securely welded to the metal sheet by projection welding.

While the upper movable electrode is in its lower or welding position, the rocker arms 136 and 138 are held apart and prevented from returning to their upper nut-receiving positions by the contact between their free ends and the outer surfaces of the bifurcated end portion 98 of the upper electrode. This construction, wherein cooperation between the rocker arms and upper electrode, prevents the former from touching the sheet metal panel or nut being welded, can be seen in Fig. 6 where the nut-positioning assembly, electrodes, nut and panel are shown in the welding position.

At the completion of the actual welding operation, which requires only a fraction of a second, the upper electrode is again raised and the tension springs 162 and 164 permitted to return the rocker arms to their upper nut-receiving positions, where they again function as extensions of the track. The sheet metal panel 20 with the nut 10 welded thereto is then removed from between the electrodes or repositioned on the lower electrode for the attachment of other nuts. Simultaneously, of course, the removal of the panel allows the compression spring 90 in the lower electrode to again force the locating pin 88 into its uppermost position for locating the next nut to be welded. The spring-loaded rocker arms and locating pin are thus all retained in their upper positions until the upper electrode again descends to weld the next nut. After the panel is in place on the lower electrode, another nut is released by the escape mechanism 58 and located on the rocker arms, and the operating cycle is repeated.

It will be understood, of course, that my nut-loading and projection welding machine could, with minor modifications, also be constructed with the lower electrode movable and the upper electrode stationary. If such an arrangement were used, it would still be desirable to have the tip of the movable electrode bifurcated and the locating pin positioned in the stationary electrode. The nuts 10 would preferably be placed on the track in an inverted position and fed to the nut-positioning assembly beneath the metal sheet to be welded. Thus when the base or body portions 12 of the nut contact the ends of the bifurcated tip of the movable lower electrode, the formed thread portion 14 of the nut would extend into the recess 56 provided by this bifurcation. The lower electrode would then be used in the same manner as the upper electrode in the modification hereinbefore described to force the nut upwardly around the locating pin and into contact with the lower surface with the sheet metal member to which it is to be attached.

It will also be appreciated that my invention may be modified and adapted to feed and position a variety of fastening devices which are attached by other means than welding, such as stoking, clinching, stapling, etc.

While a specific embodiment of my invention has been shown and described, it will be understood that various changes in the construction of the apparatus, such as reversal of parts or combination of elements, may be made without departing from the scope of the invention as set forth in the appended claims.

I claim:

1. A fastener feeding and positioning apparatus comprising a supporting frame, a pair of rocker arms pivotally mounted on said frame and adapted to receive fasteners one at a time, springs operatively connected to said arms and frame yieldingly urging said arms into fastener-receiving position wherein the free ends of said arms are adjacent and in alignment with one another, a magnet affixed to said frame adjacent one of the rocker arms for locating said fasteners on said arms, a reciprocable member for successively contacting fasteners positioned on the rocker arms to thereby pivot said arms to deposit said fasteners on a sheet of material, a track connected to said supporting frame for conveying said fasteners to the rocker arms, and an escape mechanism operatively connected to said track for successively feeding said fasteners to the upper surfaces of said rocker arms, said escape mechanism comprising a bracket connected to said track, a lever mounted for partial rotation on said bracket and pivotally actuated by said reciprocable member, and a pair of spring fingers each having one end secured to said bracket and a free end adapted to retain said fasteners against the face of said track, said lever being adapted to alternately flex said spring fingers away from the track in a direction generally perpendicular thereto to cause said free ends to alternately engage and disengage said fasteners on the track, each of said fingers being thereby adapted to retain a fastener stationary against the face of the track while the other of said spring fingers is permitting another fastener to move on said track toward the rocker arms.

2. In a nut loading and resistance welding machine provided with a stationary electrode and an oppositely disposed reciprocable electrode adapted to resistance weld nuts to a metallic member positioned between said electrodes, the combination of a hopper for containing and feeding said nuts, a track extending from said hopper to said electrodes for conveying the nuts thereto, a nut-positioning assembly located adjacent the electrode tips and comprising a supporting structure secured to said track, a pair of arms pivotally mounted on said supporting structure and adapted to receive nuts one at a time from said track and maintain them in position between the electrodes when said electrodes are spatially separated, spring means connected to the supporting structure and yieldably urging said arms into nut-receiving position as a continuation of said track, said arms being spatially separated from a metallic member positioned between said electrodes, said arms being partially rotatable in response to movement of the reciprocable electrode toward the metallic member to thereby force said nut between said arms and into engagement with said member for welding, said reciprocable electrode being movable away from said metallic member after welding to permit the spring means to pivot the arms into nut-receiving position, and an escape mechanism on the track for releasing nuts one at a time to said arms, said escape mechanism comprising a bracket affixed to the track, a lever pivotally mounted on said bracket and actuated by movement of the reciprocable electrode, and spring members secured to said bracket and movable toward and away from the nut-carrying face of the track in response to pivotal movement of the lever, said spring members each being adapted to alternately hold the nuts one at a time stationary against the nut-carrying face of the track and release them for travel toward the arms.

3. A machine for feeding and positioning fasteners to be attached to a supporting body, said machine comprising a track for conveying the fasteners to be attached, means for supplying the fasteners to said track, an assembly adjacent the lower end of said track for positioning said fasteners on the supporting body, and an escape mechanism for successively releasing said fasteners to said assembly, said escape mechanism comprising a supporting bracket secured to said track, a pair of spring fingers attached to said bracket and tensioned for movement of free ends thereof toward the fastener-carrying face of said track in a direction generally perpendicular thereto, a lever pivotally mounted on said bracket, and means for actuating said lever, said lever being provided with arm portions engageable with said spring fingers to alternately flex the ends of said fingers away from said track in a direction generally perpendicular thereto to cause said ends to successively engage and disengage fasteners along longitudinally spaced portions of the fastener-carrying face of said track, each of said fingers being adapted to hold a fastener stationary against the fastener-carrying face of the track when the other of said fingers is releasing another of said fasteners for further movement on the track to thereby feed said fasteners one at a time to the fastener-positioning assembly.

4. In an automatic nut-loading and projection welding machine provided with a motorized hopper for containing and continuously feeding sheet metal nuts to be welded, a pair of oppositely disposed and relatively reciprocable electrodes adapted to resistance weld said nuts to a metal sheet positioned between said electrodes, and a track extending generally downwardly from said hopper to said electrodes for automatically conveying the nuts thereto, a supporting structure affixed to the lower end of the track, a pair of pivotable arms mounted on said supporting structure and provided with upstanding flanges to form a nest for receiving the nuts one at a time from said track, spring members connected to the supporting structure to yieldably urge said arms into nut-receiving positions as continuations of the track, adjusting means on said supporting structure for regulating the inclination of said arms when in their nut-receiving positions, said arms being adapted to successively maintain said nuts in position between the electrodes when the said electrodes are in their disengaged positions, and a magnet affixed to said supporting structure for drawing and holding said nuts in position on said rocker arms, one of said electrodes being adapted to outwardly pivot said arms on movement toward said other electrode to thereby force said nuts one at a time between said arms and into engagement with the metal sheet between the electrodes preparatory to welding, said electrode being movable away from said metal sheet after welding to permit the spring members to return the pivotable arms to their nut-receiving positions.

5. In an apparatus for automatically feeding and welding fasteners having openings extending therethrough to a metal sheet, a hopper for supplying said fasteners to be welded, a reciprocable upper electrode, a stationary lower electrode adapted to support a metal sheet thereon, a locating pin extending from the end of said lower electrode adapted to project through an opening in said sheet, a track leading from said hopper to said electrodes for conveying said fasteners thereto, and an assembly for successively positioning said fasteners between said electrodes, said assembly comprising a supporting frame attached to said track, a pair of aligned rocker arms pivotally mounted on said supporting frame for receiving said fasteners one at a time from said track and provided with upstanding side flanges adapted to support a fastener in proper position on the upper surfaces of said arms, said rocker arms being spatially separated from said metal sheet when the latter is in position on the lower electrode, and springs extending from said supporting frame to said rocker arms for yieldingly urging said arms upwardly into their fastener-receiving positions, the reciprocable upper electrode being adapted to move downwardly toward the lower electrode and to contact a fastener located on said rocker arms, said arms being adapted to outwardly pivot on said contact to permit the continued downward movement of said upper electrode to drive said fastener onto said locating pin and into contact with a metal sheet supported on the lower electrode so as to cause said locating pin to extend through the opening in said fastener, said upper electrode being upwardly movable after the fastener is welded to the metal sheet to permit said springs to pivot the rocker arms to their fastener-receiving positions.

References Cited in the file of this patent

UNITED STATES PATENTS

| Number | Name | Date |
|---|---|---|
| 443,062 | Wile et al. | Dec. 16, 1890 |
| 527,985 | Hoofnagle | Oct. 23, 1894 |
| 1,106,393 | Mackenzie | Aug. 11, 1914 |
| 1,312,598 | Warren | Aug. 12, 1919 |
| 1,479,793 | Eek | Jan. 8, 1924 |
| 1,634,226 | Alibert | June 28, 1927 |
| 1,873,890 | Holmes | Aug. 23, 1932 |
| 1,944,510 | Hayden | Jan. 23, 1934 |
| 2,148,502 | Reyburn | Feb. 28, 1939 |
| 2,308,659 | Jendresen | Jan. 19, 1943 |